United States Patent
Newton et al.

(10) Patent No.: US 11,155,046 B2
(45) Date of Patent: Oct. 26, 2021

(54) FABRICATION OF COMPLEX-SHAPED COMPOSITE STRUCTURES

(71) Applicant: CYTEC INDUSTRIES INC., Princeton, NJ (US)

(72) Inventors: Sam Newton, Wrexham (GB); Samuel J. Hill, Wrexham (GB)

(73) Assignee: Cytec Industries Inc., Princeton, NJ (US)

( * ) Notice: Subject to any disclaimer, the term of this patent is extended or adjusted under 35 U.S.C. 154(b) by 396 days.

(21) Appl. No.: 16/068,577

(22) PCT Filed: Jan. 22, 2017

(86) PCT No.: PCT/US2017/014476
§ 371 (c)(1),
(2) Date: Jul. 6, 2018

(87) PCT Pub. No.: WO2017/127772
PCT Pub. Date: Jul. 27, 2017

(65) Prior Publication Data
US 2019/0016063 A1    Jan. 17, 2019

Related U.S. Application Data

(60) Provisional application No. 62/281,321, filed on Jan. 21, 2016.

(51) Int. Cl.
*B29C 70/20* (2006.01)
*B29C 70/44* (2006.01)
(Continued)

(52) U.S. Cl.
CPC ............ *B29C 70/205* (2013.01); *B29B 11/16* (2013.01); *B29C 70/44* (2013.01); *B29C 70/443* (2013.01); *B29C 70/48* (2013.01); *B29C 70/542* (2013.01)

(58) Field of Classification Search
CPC ..... B29C 70/44; B29C 70/205; B29C 70/541; B29C 70/542; B29C 70/543; B29C 70/443
(Continued)

(56) References Cited

U.S. PATENT DOCUMENTS 6,017,484 A * 1/2000 Hale ..................... B29C 70/342
156/286
2004/0222562 A1* 11/2004 Kirchner ............. B29C 43/3642
264/314

(Continued)

FOREIGN PATENT DOCUMENTS

EP    2087990 A1    8/2009
FR    2689809 A1    10/1993

*Primary Examiner* — Philip C Tucker
*Assistant Examiner* — Jimmy R Smith, Jr.
(74) *Attorney, Agent, or Firm* — Thi Dang

(57) ABSTRACT

A hot drape-forming method for shaping fibrous preforms and prepreg plies into complex geometries. For shaping fibrous preforms, the hot drape-forming method includes: a) dividing the total number of preforms into a plurality of sub-preforms (S1, S2, S3); and b) consecutively shaping each sub-preform (S1, S2, S3) by applying vacuum pressure and heat, wherein the shaping of all sub-preforms (S1, S2, S3) are carried out in the same tool housing (10) over the same molding surface. The resulting shaped preform (S1, S2, S3) is ready for resin infusion. The same method can also be used to shape resin-impregnated prepreg plies.

20 Claims, 6 Drawing Sheets

(51) Int. Cl.
  *B29C 70/54* (2006.01)
  *B29C 70/48* (2006.01)
  *B29B 11/16* (2006.01)
(58) Field of Classification Search
  USPC .......................................... 156/242, 244.14
  See application file for complete search history.

(56) References Cited

U.S. PATENT DOCUMENTS

2009/0008836 A1    1/2009  Kaps et al.
2014/0175709 A1*   6/2014  Blackburn ............ B29C 51/145
                                                          264/511

* cited by examiner

FABRICATION OF COMPLEX-SHAPED COMPOSITE STRUCTURES

CROSS-REFERENCE TO RELATED APPLICATIONS

The present application is a U.S. national phase entry under 35 U.S.C. § 371 of International Application No. PCT/US2017/014476, filed on 22 Jan. 2017, which claims priority to U.S. provisional Application No. 62/281,321, filed on 21 Jan. 2016, the entire content of each of these applications is explicitly incorporated herein by reference.

The present disclosure relates generally to the fabrication of composite structures.

DETAILED DESCRIPTION

Figure 1:
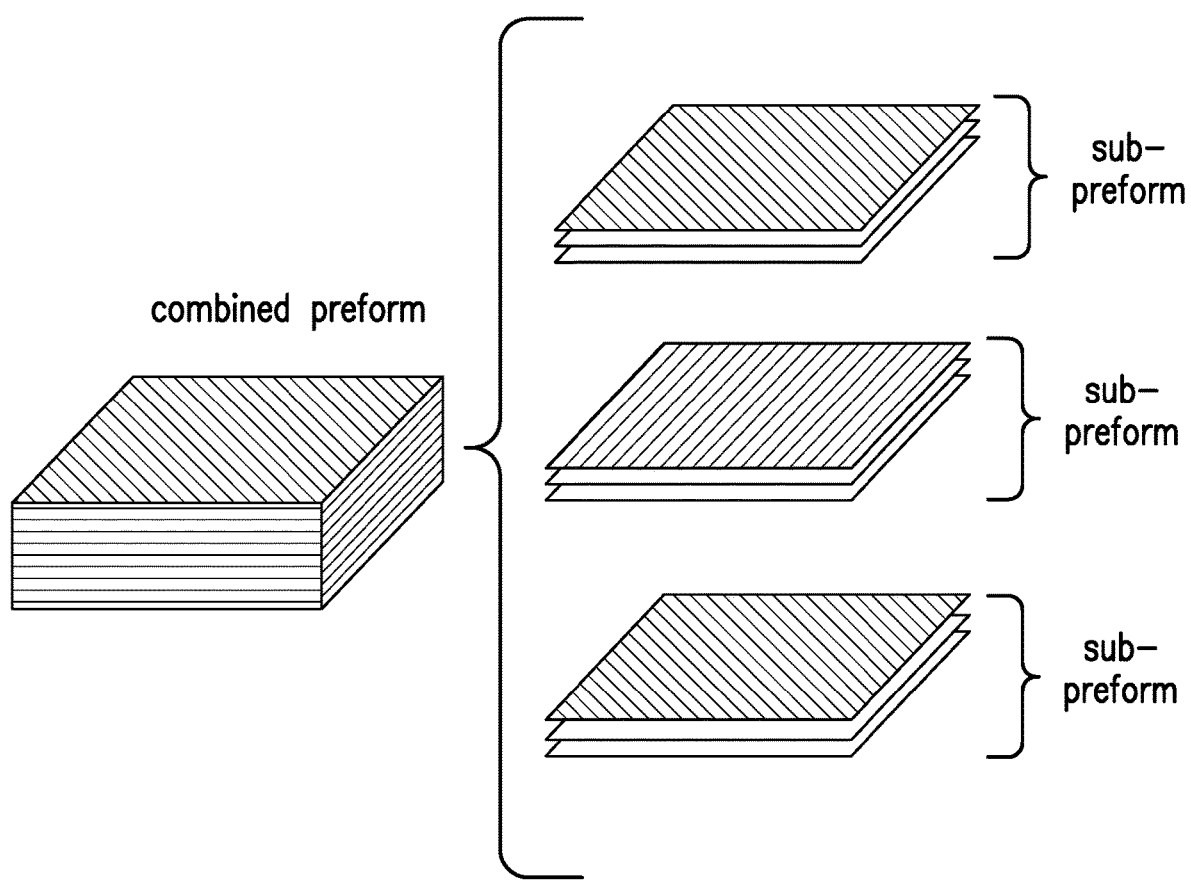
FIG. 1 illustrates how a full component layup can be divided into three sub-preforms.

In recent years, the use of fiber-reinforced composite materials has become more prevalent in aerospace and automotive industries. These composite materials exhibit high strength as well as corrosion resistant properties in harsh environment. In addition, their light-weight property is particularly advantageous when compared to similar parts constructed from metals.

Fiber-reinforced composites have been traditionally made from prepregs, which are formed of continuous fibres impregnated with a curable matrix resin, such as epoxy. The resin content in the prepreg is relatively high, typically 20%-50% by weight. Multiple plies of prepregs may be cut to size for laying up, then subsequently assembled and shaped on a molding tool. In the case where the prepreg cannot be easily adapted to the shape of the molding tool, heating may be applied to the prepregs in order to gradually deform it to the shape of the molding surface.

More recently, fiber-reinforced polymer composites are made by utilizing liquid resin infusion processes, which include Resin Transfer Molding (RTM), and Vacuum Assisted Resin Transfer Molding (VARTM). To form composite parts via a resin infusion process, layers of reinforcement fibers are first laid up on a mold to form a shaped preform and then liquid resin is injected directly in-situ into the preform. The layers of fibers are usually in the form of fabric plies that are substantially resin-free. After resin infusion, the resin-infused preform is cured according to a curing cycle to produce a hardened composite structure. Resin infusion such as RTM is used not only to manufacture small, complex-shaped parts but also large parts of aircrafts such as the entire wing.

To form composite parts via resin infusion, the layup of the preform is an important element in the fabrication process. The preform is in essence the structural part awaiting resin. For certain aircraft parts, a flat, 2-dimensional (2D) preform blank is shaped into a 3-dimensional (3D) geometry prior to resin infusion. The preform blank is a layup of fibrous layers assembled in a stacking sequence. The fibrous layers are typically plies of continuous, unidirectional carbon fibers. The plies may be oriented at different angles from one another depending on the structural properties desired for the final composite part. For example, the unidirectional fibers in each ply may be oriented at a selected angle θ, such as 0°, 45°, or 90°, with respect to the length of the layup. It has been observed that when a high number of plies are shaped to form complex geometries such as C-shaped or U-shaped wing spars of an aircraft, wrinkling of the plies and fiber buckling become an issue.

A method (referred herein as a "hot drape forming method") for shaping fibrous preforms of complex geometries is disclosed, wherein a high number of fiber layers can be laid up without wrinkle formation or fiber buckling. Generally, the hot drape-forming method includes:

a) dividing the total number of fibrous preforms into a plurality of sub-preforms; and b) consecutively (i.e., in sequence), shaping each sub-preform by applying vacuum pressure and heat, wherein the shaping of all sub-preforms are carried out in the same tool housing over the same molding surface.

Each sub-preform consists of multiple layers of fibers (or plies) laid up in a stacking sequence. The number of sub-preforms is 2 or higher, for example, 2 to 5. When combined, the sub-preforms provide the total number of plies required for a full component layup, which is the final preform to be infused with resin. FIG. 1 illustrates how a full component layup can be divided into three sub-preforms. The full component layup refers to the number fibrous plies that are required to achieve the desired mechanical performance of the component part to be manufactured. The division or grouping of the full component layup into smaller sub-groups is defined herein as sub-preforms.

The fibrous plies of the sub-preform are held in place (i.e., "stabilized") by a small amount of binder to maintain the alignment of the fibers and to stabilize the fibrous layers. The binder holds the fibers in position during the subsequent resin infusion process, which typically requires pressurized injection of the liquid resin into the preform. Such binder may be applied in liquid form or powder form to each fibrous ply and/or between adjacent plies.

Figure 2:
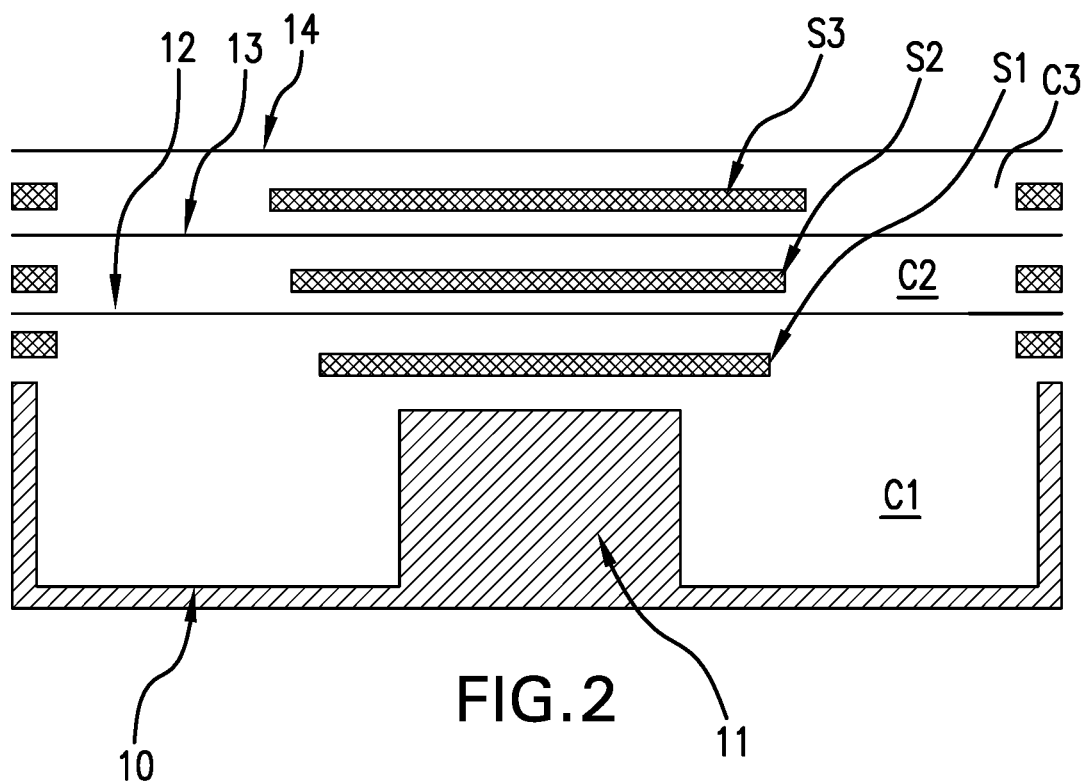
FIG. 2 schematically illustrates a set-up for shape forming three sub-preforms according to an embodiment of the present disclosure.
Figure 3:
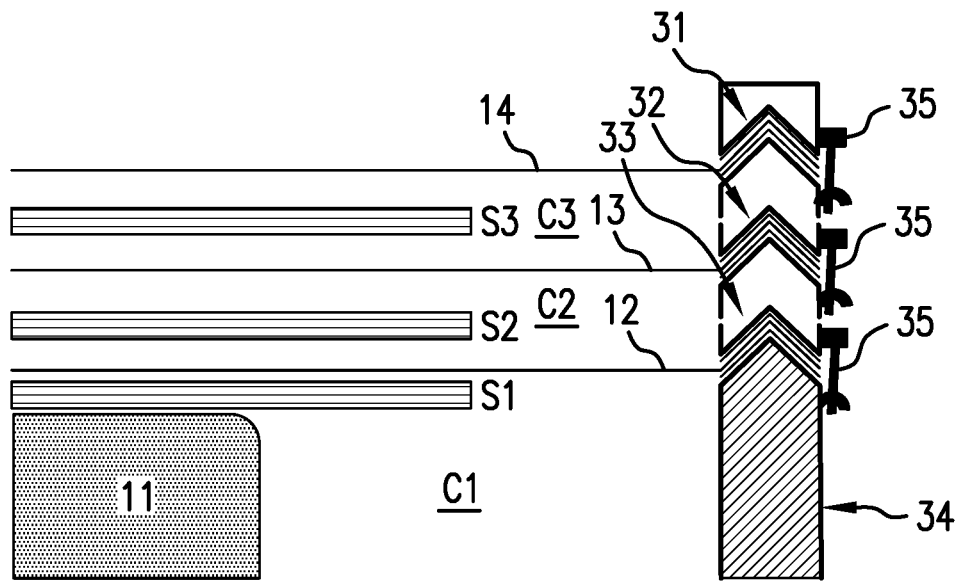
FIG. 3 shows an embodiment for attaching diaphragms to a tool housing.
Figure 4:
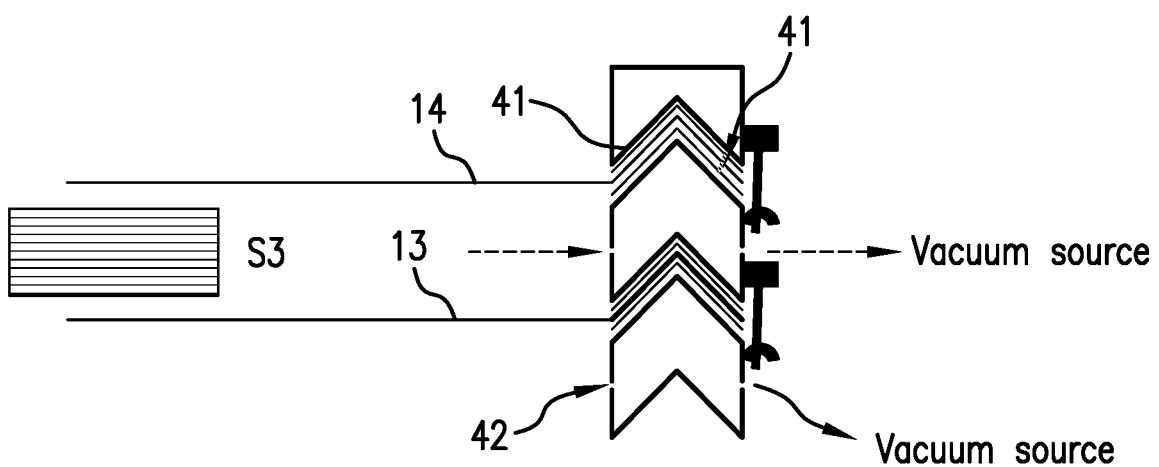
FIG. 4 shows a close-up view of the mechanisms for clamping diaphragms to a tool housing.

FIG. 2 illustrates the set-up for carrying out the hot drape forming method according to one embodiment. Referring to FIG. 2, a tool housing 10 containing a mold 11 with a convex-shaped molding surface is provided. As an initial step, a substantially flat sub-preform S1 is placed on top of the molding surface of the mold 11. A lowermost flexible diaphragm 12 is then placed over the tooling housing 10 and fastened to the perimeter of the tooling housing 10 to make an airtight seal. As such, a sealed chamber C1 is defined by the lowermost diaphragm 12 and the tool housing 10. A second sub-preform S2 is placed above the diaphragm 12 and a second flexible diaphragm 13 is arranged above the lowermost diaphragm 12 to enclose the second sub-preform S2 and to define an airtight sealed enclosure (or "pocket") C2 between the diaphragms 12 and 13. Next, a third sub-preform S3 is placed above the diaphragm 13 and a third flexible diaphragm 14 is arranged above the diaphragm 13 to enclose the third sub-preform S3 and to define an airtight sealed pocket C3 between the diaphragms 13 and 14. The diaphragms 12, 13 and 14 may be attached to the tool housing 10 using conventional clamping and sealing mechanisms. As an example, each of the diaphragms 12, 13 and 14 may be attached to a frame at its perimeter to maintain the desired diaphragm shape through a supported perimeter. And the diaphragm frames are attached to the tool housing 10 through mechanical clamping mechanisms so as to create the air-tight, sealed chamber C1, and to define the sealed pockets C2, C3 between adjacent diaphragms. The shapes of the diaphragms' frames are specially designed to fasten the diaphragms to the perimeter and to generate a seal. As an example, FIG. 3 shows counterpart frames 31, 32, 33 may be provided to securely fasten the diaphragms 12, 13, 14 to the perimeter of the tool housing. Referring to FIG. 3, the sidewall 34 of the tool housing is configured to mate with the lowest counterframe 33 so as to fasten the lowest diaphragm 12 to the tool housing. The counter frames 31, 32, 33 are mechanically clamped together and to the sidewall 34 of the tool housing by clamps 35. The addition of, for example, rubber seals 41 on the surfaces of the counterpart frames, as shown in FIG. 4, as well as on the top surface of the sidewall 34, will generate an air tight seal when under a clamping force. Each of the sealed chamber C1 and pockets C2, C3 is connected to a separate vacuum source (not shown). Referring to FIG. 4, the vacuum source for chambers C2 and C3 may be delivered via perforations 42 in the inner wall of the counterframes, which are hollow, and a vacuum source is then connected to an opening in the outside surface of each hollow frame via a vacuum line, allowing control of the pressure in the seal pockets C2 and C3 to evacuate air therefrom. Note that three sub preforms and three diaphragms are shown but the set-up may be modified to accommodate just two sub-preforms or more than three sub-preforms by changing the number of diaphragms.

Initially, air between the diaphragms (12, 13, 14) is partially removed to firmly hold the sub-preforms S2 and S3 in place. Next, heating is carried out to soften the binder in the sub-preforms and to enable the sub-preforms to lose their rigidity. Heat may be provided by a bank of infrared lamps above the tool housing 10 and/or adjacent to the sidewall(s) of the tool housing. Heat may also be provided by placing the tool housing in an oven, or with the addition of a heated mat placed directly on top of the diaphragm assembly.

Figure 5:
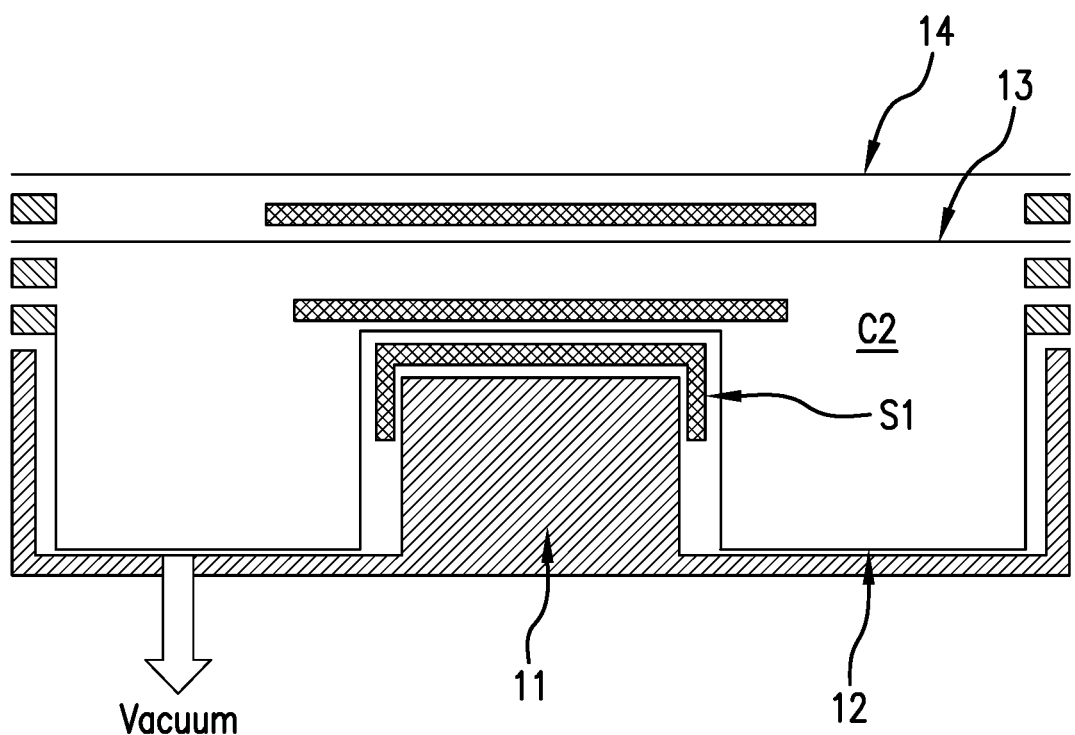
FIGS. 5-7 schematically illustrate a hot drape forming method based on the set-up shown in FIG. 2.

Referring to FIG. 5, upon reaching the desired temperature, air is evacuated from the sealed chamber C1 of the tool housing 10 at a pre-determined rate, for example, about 1 mbar/min or faster, more specifically, in the range of about 1 mbar/min to about 50 mbar/min. As the sealed chamber C1 is being evacuated, the lowermost diaphragm 12 is pulled towards the mold 11 causing the sub-preform S1 to conform to the shape of the mold surface. Concurrently with the evacuation of the sealed chamber C1, air from the sealed pocket C2 (between diaphragms 12 and 13) is vented to atmospheric pressure so as to prevent the diaphragms 13, 14 from being pulled at the same time as the diaphragm 12, thereby preventing pre-mature shaping of sub-preforms S2 and S3.

Figure 6:
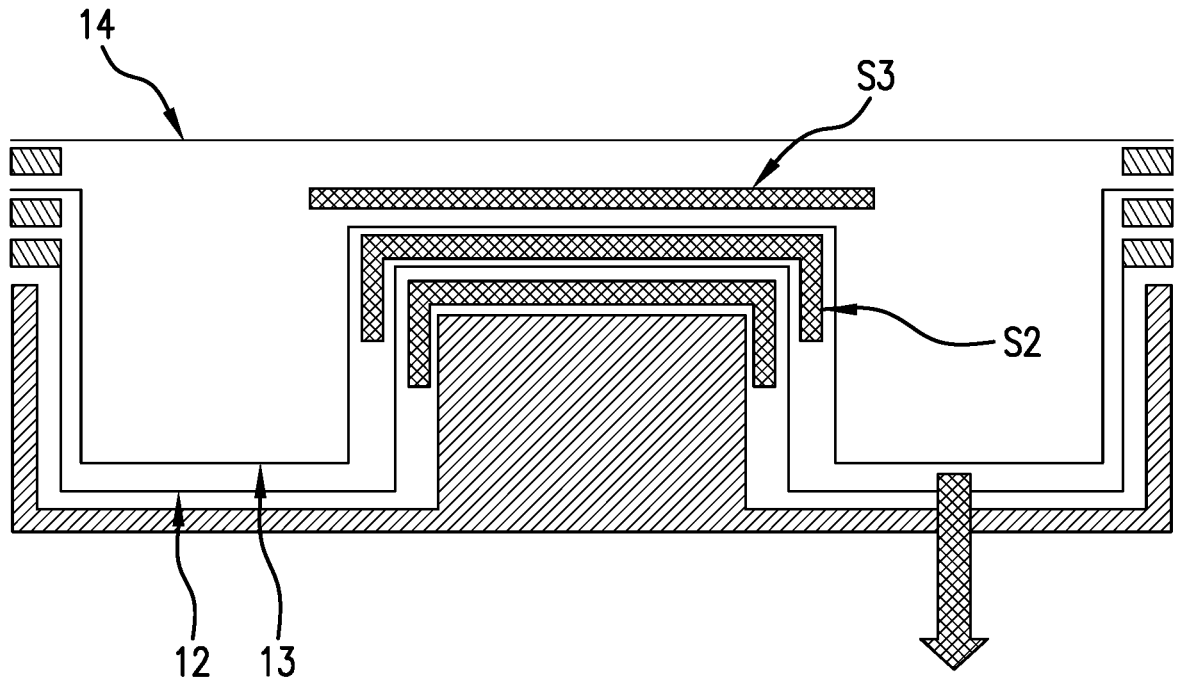

Referring to FIG. 6, once the vacuum level of the sealed chamber C1 has reached a level of at least 10 mbar absolute pressure, for example, until a vacuum pressure within the range of about 250 to about 1000 mbar is reached, air between the diaphragms 12 and 13 (i.e., sealed pocket C2) is evacuated at a predetermined rate, causing the sub-preform S2 to conform to the outer geometry of the previously shaped sub-preform S1, and concurrently, the sealed pocket between diaphragms 13 and 14 is vented to atmospheric pressure to prevent the diaphragm 14 from being pulled at the same time as diaphragm 13, thereby preventing the shaping of sub-preform S3. Air may be evacuated from the sealed pocket C2 between the diaphragms 12 and 13 at rate of 1 mbar/min or faster, more specifically, in the range of about 1 mbar/min to about 50 mbar/min.

Figure 7:
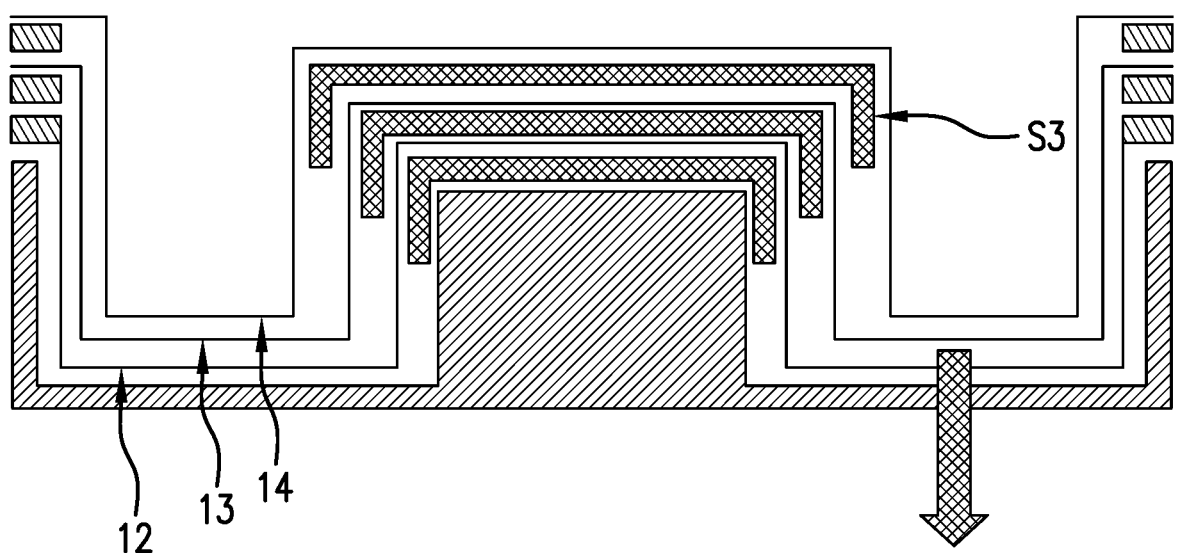

Referring to FIG. 7, when the pressure in sealed pocket C2 between the diaphragms 12 and 13 reaches a pressure greater than 10 mbar absolute pressure, for example, until a vacuum pressure within the range of about 250 to about 1000 mbar is reached, air between diaphragms 13 and 14 (i.e., sealed pocket C3) is evacuated at a predetermined rate, causing the sub-preform S3 to conform to the outer geometry of the previously shaped sub-preform S2. Air may be evacuated from the sealed pocket C3 between diaphragms 13 and 14 at rate of 1 mbar/min or faster, more specifically, in the range of about 1 mbar/min to about 50 mbar/min.

Heating is maintained during the shaping of all sub-preforms. In this way, the sub-preforms can be carried out within a single heating cycle.

Once the shape forming process of the sub-preforms is completed, the pressure between the tooling chamber and the lowermost diaphragm and between consecutive diaphragms can be tailored to optimize the compaction of the sub-preforms prior to and during the cooling phase of the process. Such tailoring is performed by continuing to evacuate air from the sealed chamber of the tooling housing and from the inter-diaphragm regions until the desired pressure is reached to achieve the desired preform compaction. The compaction of the sub-preforms may be tailored in order to control the bulkiness of the final preform, which in turn can affect the permeability characteristics of the material. Bulkiness may need to be tailored in order to fit the preform into a particular mold for resin infusion, while permeability may need to be tailored in order to optimize the characteristics of the fibrous material for resin infusion.

After the shape forming process is completed, the sub-preforms are cooled. At this point, the binder in the sub-preforms re-solidified and the sub-preforms retain their newly formed geometry. Upon cooling of the sub-preforms, the vacuum between the diaphragms (12, 13, 14) and between diaphragm 12 and the tool housing 10 is sequentially relieved by venting to atmosphere, and the shaped sub-preforms are sequentially removed. The topmost diaphragm 14 is lifted away first, so that the shaped sub-preform S3 can be removed, followed by the removal of diaphragm 13, sub-preform S2, diaphragm 12, and then sub-preform S1. Air is then re-introduced into the tool housing 10, and the shape forming process is ready to be repeated. The removed sub-preforms are then assembled into the final preform for subsequent resin infusion.

The flexible diaphragms for the hot drape forming method may be non-elastic sheets of polyamide (e.g. nylon material) or elastically deformable sheets of rubber or silicone, having a thickness of less than about 100 μm. A flexible sheet as disclosed herein refers to a sheet of material having an elongation to failure above 100%, e.g. 100% to 750%, as determined by ASTM D882.

Figure 8:
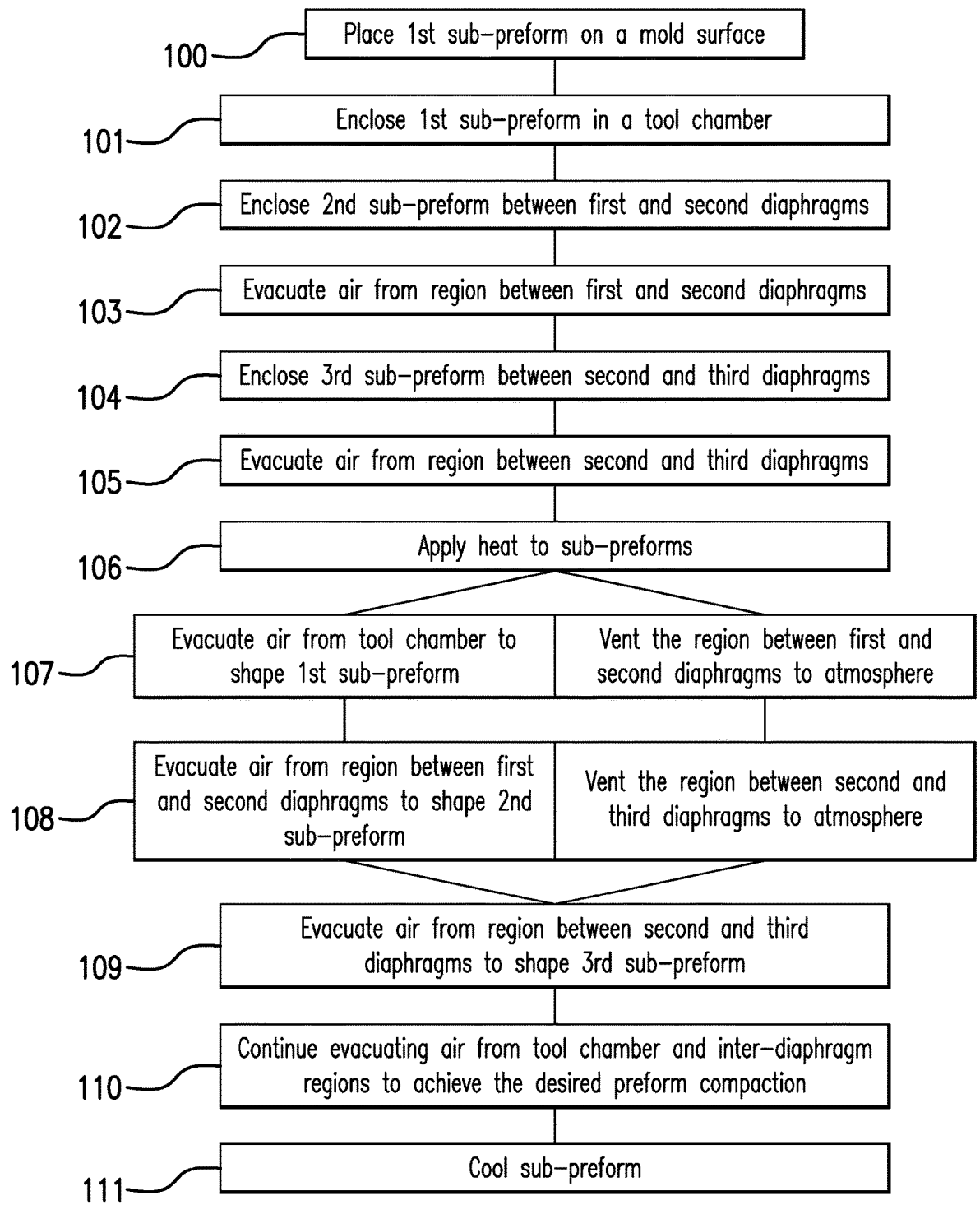
FIG. 8 is a flow chart for a hot drape forming method according to an embodiment of the present disclosure.

FIG. 8 is the flowchart for the hot drape forming method that is described in reference to FIGS. 5-7. Three sub-preforms are disclosed for illustration purposes, but it should be understood that this method can apply to any number of sub-preforms, for example, two sub-preforms or more than three sub-preforms. At 100 in FIG. 8, a first moldable sub-preform is placed on top of the molding surface of a mold, which is positioned in a tool housing. At 101, a first flexible diaphragm is placed over the tooling housing and fastened to the perimeter of the tooling housing to make an airtight seal. As such, a sealed chamber is defined by the first diaphragm and the tool housing. At 102, a second moldable sub-preform is placed above the first diaphragm and a second flexible diaphragm is arranged above the second sub-preform to enclose the second sub-preform and to define an airtight sealed enclosure (or "pocket") between the first and second diaphragms. At 103, air between the first and second diaphragms is partially removed to firmly hold the second sub-preform in place. At 104, a third moldable sub-preform is placed above the second diaphragm and a third flexible diaphragm is arranged above the third sub-preform to enclose the third sub-preform and to define an airtight sealed enclosure (or "pocket") between the second and third diaphragms. At 105, air between the second and third diaphragms is partially removed to firmly hold the third sub-preform in place. At 106, heat is applied to the sub-preforms to soften the binder therein.

At 107, air is evacuated from the sealed chamber of the tool housing at a pre-determined rate and the first diaphragm is pulled towards the mold surface, causing the first sub-preform to conform to the shape of the mold surface. Concurrently with the evacuation of the sealed chamber of the tool housing, air from the sealed pocket between the first and second diaphragms is vented to atmospheric pressure so as to prevent the second and third diaphragms from being pulled at the same time, thereby preventing the pre-mature shaping of the second and third sub-preforms.

At 108, once the vacuum level of the sealed chamber of the tool housing has reached a level of at least 10 mbar (TBC) absolute pressure, for example, until a vacuum pressure within the range of about 250 to about 1000 mbar is reached, air between the first and second diaphragms is evacuated at a predetermined rate and the second diaphragm is pulled towards the previously shaped first sub-preform, causing the second sub-preform to conform to the outer geometry of the first sub-preform, and concurrently, the sealed pocket between second and third diaphragms is vented to atmospheric pressure to prevent the third diaphragm from being pulled at the same time, thereby preventing the pre-mature shaping of the third sub-preform. At 109, once the vacuum level of the sealed pocket between the first and second diaphragms has reached a level greater than 10 mbar absolute pressure, air between the second and third diaphragms is evacuated at a predetermined rate and the third diaphragm is pulled towards the previously shaped second sub-preform, causing the third sub-preform to conform to the outer geometry of the shaped second sub-preform. As disclosed above, air may be evacuated at a rate of 1 mbar/min or faster, more specifically, in the range of about 1 mbar/min to about 50 mbar/min, during the shaping of each sub-preform.

At 110, air is continued to be evacuated from the tool housing and the inter-diaphragm regions until the desired pressure is reached and the desired preform compaction is achieved. At 111, the sub-preforms are cooled until they retain their rigidity.

The hot drape forming method of the present disclosure allows sub-preform assembly without the associated time penalty and the cost of a multi-step process route. The disclosed hot drape forming method also allows the forming technology to be applied to a wider range of forming geometries, laminate stacking sequences and ply counts, thereby offering a significant advancement in preform forming technology.

Preform Materials

The sub-preforms and preforms in the present context is an assembly of dry fibers or layers of dry fibers that constitute the reinforcement component of a composite, and are in a form suitable for resin infusion application such as RTM.

The sub-preform blank to be shaped consists of multiple layers or plies of fibrous material, which may include unidirectional fibers, nonwoven mats, woven fabrics, knitted fabrics, and non-crimped fabrics. The sub-preform blank may be substantially flat. A "mat" is a nonwoven textile fabric made of randomly arranged fibers, such as chopped fiber filaments (to produce chopped strand mat) or swirled filaments (to produce continuous strand mat) with a binder applied to maintain its form. Suitable fabrics include those having directional or non-directional aligned fibers in the form of mesh, tows, tapes, scrim, braids, and the like. The fibers in the fibrous layers or fabrics may be organic or inorganic fibers, or mixtures thereof. Organic fibers are selected from tough or stiff polymers such as aramids (including Kevlar), high-modulus polyethylene (PE), polyester, poly-p-phenylene-benzobisoxazole (PBO), and hybrid combinations thereof. Inorganic fibers include fibers made of carbon (including graphite), glass (including E-glass or S-glass fibers), quartz, alumina, zirconia, silicon carbide, and other ceramics. For making high-strength composite structures, such as primary parts of an airplane, the fibers preferably have a tensile strength of 3500 MPa (or 500 ksi).

To form the sub-preform blank, a binder composition may be applied to each fibrous layer (e.g. layer of unidirectional fibers), and a plurality of binder-treated fibrous layers are then assembled by stacking. The binder may be applied to the fibrous layers prior to or during the layup of the fibrous layers. The assembly of the fibrous layers may be done by a hand layup process or an automated placement process such as Automated Tape Laying (ATL) and Automated Fiber Placement (AFP) or other automated methods of depositing the fibers or plies in a broad good or pre-prepared form. The stack of fibrous layers is then laminated to each other by applying heat and pressure.

In some embodiments, the sub-preforms are divided according to the desired stacking sequence and the number of plies oriented in 0° (0 degree) direction within the layup of the final preform. Two or more flexible diaphragms are arranged to separate the sub-preforms from each other and to define a separate, sealed enclosure for each sub-preform. Controlling the pressure between adjacent diaphragms then allows individual sub-preforms to be shaped separately and consecutively in the same heating cycle, thereby preventing undesirable wrinkle formation and increasing process efficiency as compared to conventional multiple-step processes for making shaped preforms.

In some embodiments, each sub-preform contains multiple plies of continuous, unidirectional fibers, each ply oriented at a different angle relative to an adjacent ply. The number of plies in each sub-preform may be 2 to 30. In some embodiments, each sub-preform contains a limited number of 0 degree (0°) plies, e.g., 1 to 10 plies. 0 degree ply refers to a ply with unidirectional fibers oriented parallel to the length or longitudinal axis of the layup.

Binder

The binder for bonding the fibrous layers in the sub-preform may be in various forms, including powder, liquid, paste, film, fibers, and non-woven veils. The binder material may be selected from thermoplastic polymers, thermoset resins, and combinations thereof. In certain embodiments, the binder may take the form of polymeric fibers formed from thermoplastic material or thermoset material, or a blend of thermoplastic and thermoset materials.

In one embodiment, the binder in the sub-preforms is a solid polymeric material at ambient temperature (20° C.–25° C.). When heated, the binder transitions to a molten state, allowing the sub-preforms to soften and to be shaped. The shape forming temperature is dictated by the property of the binder and can be optimized to minimize the friction between adjacent fibrous plies as they slip past one another during the shape forming process so as not to create undesirable fiber distortions or wrinkles. A particularly suitable binder is the thermoplastic-epoxy binder described in U.S. Pat. No. 8,927,662. This binder contains a blend of epoxy resin and thermoplastic polymer, and can be applied to the fibrous layers in powder form.

Another suitable binder is the liquid binder composition described in U.S. Pub. No. 2014/0179187, which can be applied (e.g. by spraying) onto the dry fibrous layers followed by drying to remove the solvent.

If applied in film form, a binder resin composition may be deposited (e.g. by casting) onto a release paper to form a film, which is then transferred to a fibrous layer. Such binder film is inserted between the fibrous layers of the sub-preform.

In other embodiments, the binder is a mixture of thermoplastic fibers (i.e., fibers formed from a thermoplastic material) and thermoset fibers (i.e., fibers formed from a thermoset material). Such polymeric fibers may be incorporated into the sub-preforms as a non-woven veil composed of randomly-arranged polymeric fibers to be inserted between adjacent fibrous layers. Such non-woven veil can be softened by heating to provide bonding between fibrous layers. As an example, the resin-soluble thermoplastic veil disclosed in U.S. Pat. No. 8,703,630 would be suitable.

The total amount of binder(s) is sufficiently small such that the binder-treated sub-preforms remain porous and permeable to the liquid resin used in resin infusion processes. As example, the total amount of binder materials in the sub-preform may be about 20% or less by weight, e.g. about 0.1 to about 15% by weight, in some embodiments, 0.5% to 10% by weight, based on the total weight of the sub-preform.

Prepreg Layup

The hot drape-forming method disclosed herein can also be applied to the assembly of prepreg plies, which are pre-impregnated with a curable resin. Each prepreg ply consists of a layer of reinforcement fibers impregnated with or embedded in a curable resin. The layer of reinforcement fibers may be in the form of continuous unidirectional fibers or a woven fabric. The total composite layup of prepregs may be divided into sub-groups, each sub-group consisting of two or more prepreg plies as in the case of sub-preforms. The prepreg plies may contain unidirectional fibers that are oriented at different orientations as described above for the sub-preforms and preforms. The sub-groups are then shaped consecutively as described above. In this case, heating is applied at a temperature that is sufficient to soften the curable resin in the prepreg plies and to enable shaping of the prepreg plies but the temperature is not high enough to instigate full curing of the matrix resin.

What is claimed is:

1. A shape forming method for fabricating a fibrous preform with three-dimensional configuration, comprising:
   (a) providing a tool housing with a mold positioned therein, said mold having a non-planar molding surface;
   (b) placing a first moldable sub-preform over the non-planar molding surface;
   (c) attaching a first flexible diaphragm to the tool housing so as to define a sealed chamber bounded by the first diaphragm and the tool housing and to enclose the first sub-preform and the mold in said sealed chamber;
   (d) enclosing a second moldable sub-preform between the first diaphragm and a second flexible diaphragm, which is placed above the first diaphragm, the first and second diaphragms defining an air-tight sealed pocket;
   (e) applying heat to the sub-preforms;
   (f) evacuating air from the sealed chamber bound by the first diaphragm and the tool housing until a vacuum pressure is reached such that the first diaphragm is pulled toward the non-planar molding surface, causing the first sub-preform to conform to the non-planar molding surface, thereby forming a first shaped sub-preform, and concurrently with evacuating air from the sealed chamber, venting the sealed pocket between the first and second diaphragms to atmospheric pressure to prevent the second diaphragm from being pulled toward the non-planar molding surface at the same time;
   (g) evacuating air from the sealed pocket between the first and second diaphragms until a vacuum pressure is reached such that the second diaphragm is pulled toward the mold, causing the second sub-preform to conform to the outer surface of the first sub-preform, thereby forming a second shaped sub-preform;
   (h) cooling the shaped sub-preforms; and
   (i) assembling the shaped sub-preforms into a final preform that can be infused with a liquid resin,
   wherein each sub-preform comprises a plurality of fibrous layers bonded to each other and each sub-preform is permeable to liquid resin.

2. The shape forming method of claim 1 further comprising:
   between (d) and (e), enclosing a third moldable sub-preform between the second diaphragm and a third flexible diaphragm, which is placed above the second diaphragm, the second and third diaphragms defining an air-tight sealed pocket;
   concurrently with (g), venting the sealed pocket between the second and third diaphragms to atmospheric pressure to prevent the third diaphragm from being pulled toward the non-planar molding surface at the same time as the second diaphragm; and
   between (g) and (h), evacuating air from the sealed pocket between the second and third diaphragms until a vacuum pressure is reached such that the third diaphragm is pulled toward the mold, causing the third sub-preform to conform to the outer surface of the second shaped sub-preform, thereby forming a third shaped sub-preform.

3. The shape forming method of claim 2, wherein air is evacuated from the sealed pocket between the second and third diaphragms at a rate of about 1 to about 50 mbar/min.

4. The shape forming method of claim 2, wherein air is evacuated from the sealed pocket between the second and third diaphragms until a vacuum pressure within the range of about 250 to 1000 mbar is reached.

5. The shape forming method of claim 1, wherein
   air is evacuated at (f) from the sealed chamber bound by the first diaphragm and the tool housing at a rate of about 1 to about 50 mbar/min, and
   air is evacuated at (g) from the sealed pocket between the first and second diaphragms at a rate of about 1 to about 50 mbar/min.

6. The shape forming method of claim 1, wherein
air is evacuated at (f) from the sealed chamber bound by the first diaphragm and the tool housing until a vacuum pressure within the range of about 250 to about 1000 mbar is reached, and
air is evacuated at (g) from the sealed pocket between the first and second diaphragms until a vacuum pressure within the range of about 250 to about 1000 mbar is reached.

7. The shape forming method of claim 1 further comprising, after (g) and before (h), evacuating air from the sealed chamber bound by the first diaphragm and the tool housing and from the sealed pocket between the first and second diaphragms to achieve further compaction of the sub-preforms.

8. The shape forming method of claim 1 further comprising, between (d) and (e), partially evacuating air from the sealed pocket between the first and second diaphragms to hold the second sub-preform in place.

9. The shape forming method of claim 1, wherein each sub-preform comprises a binder for bonding the fibrous layers together and heat is applied at (e) to soften the binder in the sub-preforms.

10. The shape forming method according to claim 9, wherein the binder in each sub-preform comprises a blend of epoxy resin and a thermoplastic polymer.

11. The shape forming method of claim 1, wherein each fibrous layer comprises fibers formed of a material selected from: carbon, aramid, glass, polyethylene (PE), polyester, poly-p-phenylene-benzobisoxazole (PBO), quartz, alumina, zirconia, silicon carbide, and combinations thereof.

12. The shape forming method of claim 1, wherein the flexible diaphragms are sheets of polyamide or elastically deformable sheets of rubber or silicone.

13. The shape forming method according to claim 12, wherein each flexible diaphragm has a thickness of less than about 100 μm.

14. The shape forming method of claim 1, wherein each sub-preform comprises multiple layers of unidirectional fibers.

15. The shape forming method according to claim 14, wherein each layer of unidirectional fibers comprises fibers oriented at an angle relative to the fibers in an adjacent layer.

16. The shape forming method of claim 1, wherein the number of fibrous layers in each sub-preform is 2 to 30.

17. The shape forming method of claim 1, wherein each sub-preform comprises multiple layers of unidirectional fibers, and at least one layer in each sub-preform comprises fibers oriented in a direction parallel to a longitudinal axis of the sub-preform.

18. A method of fabricating a fiber-reinforced composite part comprising:
fabricating a fibrous preform with three-dimensional configuration according to the method of claim 1;
infusing the fibrous preform with a curable, liquid resin; and
curing the resin-infused preform.

19. The method of claim 18, wherein the curable, liquid resin comprises one or more thermoset resins and a curing agent.

20. A method for shaping prepreg plies, comprising:
(a) providing a tool housing with a mold positioned therein, said mold having a non-planar molding surface;
(b) placing a first moldable prepreg layup over the non-planar molding surface;
(c) attaching a first flexible diaphragm to the tool housing so as to define a sealed chamber bounded by the first diaphragm and the tool housing and to enclose the first prepreg layup and the mold in said sealed chamber;
(d) enclosing a second moldable prepreg layup between the first diaphragm and a second flexible diaphragm, which is placed above the first diaphragm, the first and second diaphragms defining an air-tight sealed pocket;
(e) applying heat to the prepreg layups;
(f) evacuating air from the sealed chamber bound by the first diaphragm and the tool housing until a vacuum pressure is reached such that the first diaphragm is pulled toward the non-planar molding surface, causing the first prepreg layup to conform to the non-planar molding surface, thereby forming a first shaped prepreg layup, and concurrently with evacuating air from the sealed chamber, venting the sealed pocket between the first and second diaphragms to atmospheric pressure to prevent the second diaphragm from being pulled toward the non-planar molding surface at the same time;
(g) evacuating air from the sealed pocket between the first and second diaphragms until a vacuum pressure is reached such that the second diaphragm is pulled toward the mold, causing the second prepreg layup to conform to the outer surface of the first shaped prepreg layup, thereby forming a second shaped prepreg layup;
(h) cooling the shaped prepreg layups; and
(i) assembling the shaped prepreg layups into a final prepreg layup,
wherein each prepreg layup comprises a plurality of prepreg plies, each prepreg ply comprising reinforcing fibers impregnated with a curable resin.

* * * * *